(12) United States Patent
Stavrulov

(10) Patent No.: US 7,047,207 B2
(45) Date of Patent: May 16, 2006

(54) METHOD FOR CUSTOMIZING CONSUMER PRODUCT PACKAGING BY VARYING IMAGES APPEARING ON PACKAGES

(76) Inventor: Igor Anatolievich Stavrulov, ul, Michurina, 17-90, Khimki, 141400 (RU)

( * ) Notice: Subject to any disclaimer, the term of this patent is extended or adjusted under 35 U.S.C. 154(b) by 921 days.

(21) Appl. No.: 09/803,329

(22) Filed: Mar. 9, 2001

(65) Prior Publication Data

US 2002/0046079 A1   Apr. 18, 2002

Related U.S. Application Data

(63) Continuation-in-part of application No. 09/646,248, filed on Sep. 14, 2000, now abandoned.

(30) Foreign Application Priority Data

| Mar. 18, 1998 | (WO) | ..................... PCT/RU99/00050 |
| Sep. 5, 1998 | (WO) | ..................... PCT/RU99/00412 |
| Sep. 5, 1998 | (WO) | ..................... PCT/RU99/00413 |
| Sep. 9, 1998 | (WO) | ..................... PCT/RU99/00321 |
| Sep. 9, 1998 | (WO) | ..................... PCT/RU99/00322 |
| Sep. 9, 1998 | (WO) | ..................... PCT/RU99/00323 |
| Sep. 9, 1998 | (WO) | ..................... PCT/RU99/00324 |
| Feb. 17, 1999 | (WO) | ..................... PCT/RU99/00411 |

(51) Int. Cl.
    *G06F 17/60*   (2006.01)
(52) U.S. Cl. ...................................... 705/10
(58) Field of Classification Search .................. 705/10, 705/14, 27; 53/411, 445; 156/215
    See application file for complete search history.

(56) References Cited

U.S. PATENT DOCUMENTS

| 2,648,156 | A | * | 8/1953 | William ..................... 446/79 |
| 3,770,278 | A | * | 11/1973 | Mueller ................... 273/153 R |
| 4,797,291 | A | * | 1/1989 | Pierce et al. ................... 426/63 |
| 4,972,329 | A | * | 11/1990 | Breger ....................... 358/1.18 |
| 5,005,698 | A | * | 4/1991 | Mikhail ...................... 206/257 |
| 5,025,610 | A | * | 6/1991 | Graushar ..................... 53/411 |
| 5,031,645 | A | * | 7/1991 | Kim ............................. 131/329 |
| 5,297,488 | A | * | 3/1994 | Bunch, Jr. ................... 101/182 |
| 5,328,319 | A | * | 7/1994 | Fadaie ................... 414/416.01 |
| 5,430,992 | A | * | 7/1995 | Olson .......................... 53/399 |

(Continued)

FOREIGN PATENT DOCUMENTS

DE        EP 905027 A1 *   3/1999

(Continued)

OTHER PUBLICATIONS

McDonald, Colin, Advertising Reach and Frequency: Maximizing Advertising Results Through Effective Frequency, McGraw-Hill/Contemporary; 2nd edition, 1995, ISBN: 0844235067.*

(Continued)

*Primary Examiner*—Tariq R. Hafiz
*Assistant Examiner*—Scott L. Jarrett
(74) *Attorney, Agent, or Firm*—Knobbe Martens Olson & Bear, LLP

(57) ABSTRACT

The invention provides a method for customizing consumer product packaged thereby. The purpose of this method is to attract, increase, or retain consumer interest by varying the images appearing on packages of the products which appear to the consumer is different in most of time. The method involves selecting a number of packages the consumer will purchase without seeing the same image repeated. A group of images is randomly selected to the products such as individual packages, the consumer packages, and the cartons of consumer packages, and one image is randomly placed on each package. The method further varies the images by changing them based upon, the consumer purchasing characteristics statistically after a selected time period.

10 Claims, 1 Drawing Sheet

U.S. PATENT DOCUMENTS

| | | | |
|---|---|---|---|
| 5,553,442 A * | 9/1996 | Fadaie | 53/445 |
| 5,570,138 A | 10/1996 | Baron | |
| 5,642,485 A * | 6/1997 | Deaton et al. | 705/14 |
| 5,785,171 A * | 7/1998 | Howes | 206/232 |
| 5,806,852 A * | 9/1998 | Howes | 273/138.1 |
| 5,948,061 A * | 9/1999 | Merriman et al. | 709/219 |
| 6,135,654 A * | 10/2000 | Jennel | 400/61 |
| 6,145,885 A * | 11/2000 | Scrymgeour et al. | 283/94 |
| 6,206,190 B1 * | 3/2001 | Brochhausen | 206/457 |
| 6,286,005 B1 * | 9/2001 | Cannon | 707/100 |
| 6,318,555 B1 * | 11/2001 | Kuske et al. | 206/494 |
| 6,533,274 B1 * | 3/2003 | Heggerty | 273/139 |
| 6,594,927 B1 * | 7/2003 | Witkowski | 40/310 |

FOREIGN PATENT DOCUMENTS

| | | | |
|---|---|---|---|
| JP | 09098277 A | * | 4/1997 |
| WO | WO 97/27053 | * | 7/1997 |
| WO | PCT/RU99/00050 | | 2/1999 |
| WO | PCT/RU99/00321 | | 9/1999 |
| WO | PCT/RU99/00322 | | 9/1999 |
| WO | PCT/RU99/00323 | | 9/1999 |
| WO | PCT/RU99/00324 | | 9/1999 |
| WO | PCT/RU99/00411 | | 11/1999 |
| WO | PCT/RU99/00412 | | 11/1999 |
| WO | PCT/RU99/00413 | | 11/1999 |

OTHER PUBLICATIONS

Gupta, Sunil, Stochastic models of interpruchase time with time-dependent covariates Journal of Marketing Research, Feb. 1991, vol. 25, No. 1.*

* cited by examiner

METHOD FOR CUSTOMIZING CONSUMER PRODUCT PACKAGING BY VARYING IMAGES APPEARING ON PACKAGES

CROSS REFERENCE TO RELATED APPLICATIONS

This application is a continuation-in-part of and claims priority based upon the following:
1. U.S. application Ser. No. 09/646,248, filed Sep. 14, 2000 now abandoned, which claimed priority from PCT/RU99/00050, with an international filing date of Feb. 24, 1999, and claiming a priority date of Mar. 18, 1998;
2. PCT/RU99/00321, with an international filing date of Sep. 6, 1999, and claiming a priority date of Sep. 9, 1998;
3. PCT/RU99/00322, with an international filing date of Sep. 6, 1999, and claiming a priority date of Sep. 9, 1998;
4. PCT/RU99/00323, with an international filing date of Sep. 6, 1999, and claiming a priority date of Sep. 9, 1998;
5. PCT/RU99/00324, with an international filing date of Sep. 6, 1999, and claiming a priority date of Sep. 9, 1998;
6. PCT/RU99/00411, with an international filing date of Nov. 3, 1999, and claiming a priority date of Feb. 17, 1999;
7. PCT/RU99/00412, with an international filing date of Nov. 3, 1999, and claiming a priority date of Nov. 5, 1998; and
8. PCT/RU99/00413, with an international filing date of Nov. 3, 1999, and claiming a priority date of Nov. 5, 1998.

All of the above applications are incorporated herein by reference:

TECHNICAL FIELD OF INVENTION

The invention pertains to the art of giving greater product identity, and greater consumer usefulness, attractiveness and interest in generally homogenous products by varying the appearance on at least a portion of the packaging such that it is likely each package selected or used by the customer during a selected period of time will a bear a different image. The method can be used for all levels of packaging, including consumer packages of the product and individually packaged units or pieces of the product contained within the consumer package.

* Cross Reference to Related Applications:
1. PCT/RU99/00321, with an international filing date of Sep. 6, 1999, and claiming a priority date of Sep. 9, 1998;
2. PCT/RU99/00322, with an international filing date of Sep. 6, 1999, and claiming a priority date of Sep. 9, 1998;
3. PCT/RU99/00323, with an international filing date of Sep. 6, 1999, and claiming a priority date of Sep. 9, 1998;
4. PCT/RU99/00324, with an international filing date of Sep. 6, 1999, and claiming a priority date of Sep. 9, 1998;
5. PCT/RU99/00411, with an international filing date of Nov. 3, 1999, and claiming a priority date of Feb. 17, 1999;
6. PCT/RU99/00412, with an international filing date of Nov. 3, 1999, and claiming a priority date of Nov. 5, 1998; and
7. PCT/RU99/00413, with an international filing date of Nov. 3, 1999, and claiming a priority date of Nov. 5, 1998.

BACKGROUND

Products packaged for sale are generally packaged in various materials and bear various distinctive designs, marks, pictures, logos, decorative elements, instructions, and information from the manufacturer (hereafter "symbolics"). Often the consumer package contains multiple individual pieces of the product, which individual pieces may be separately packaged bearing symbolics.

The nearly universal method of packaging consists of placing one item of the product in an appropriate individual package, which package surfaces bear symbolics identifying the products. The individual packages are then assembled into a consumer or retail package which also bears symbolics identifying the products. The consumer packages are often assembled into a carton that is frequently used to ship and display several retail packages. The individual package generally bears the minimal necessary information on the products, and is often limited to the name of the products, its quantity, some data on the enterprise, manufacturer, date of production, and similar readable information. The consumer package generally bears more information, which includes in many cases, pictures, logos representing the manufacturer, and decorative elements which are traditionally inherent for a package of the particular kind and grade of the products. For both the consumer package and the individual package, the information may be placed on packaging surfaces directly, or it may be placed on any carrier affixed on a surface of individual packing, or it may be stitched on as a label for the products. Depending on the products involved and the preferences of the manufacturer, the packaging can be soft as used for toilet paper, or hard as the metal container used for some cookies. The carton usually bears only the basic identifying information about the product, and the consumer packages are generally not arranged in any particular order in the carton.

For example, for daily use and household products, the customer package for food and liquid products may be glass or plastic bottles, boxes, rigid packages and other vessels, and for granular products they may be boxes, packages and other suitable containers. The individual packaging may be paper or polymeric envelopes for the formed piece products, for example, for soap pieces.

By way of further example, paper based hygienic products like table napkins, towels, handkerchiefs, toilet paper, and the like are often manufactured and packaged in a manner that is identical and homogeneous, i.e., with identical color, texture, and pictures. Pampers, sanitary napkins, linings, and similar single use hygienic products also come to the retail trade in assemblies of individual products contained in a consumer package. The hygienic product contained within the consumer package may or may not have individual packaging.

By way of further example, confectionary products such as cookies, candies, sweets, chocolate in bars, chocolate in pieces, chewing gum slices, and similar products commonly are sold in consumer packages containing separately wrapped pieces protecting the individual products.

By way of further example, homogenous food stuffs such as single use tea packs, cheese slices, sausage, soft drinks, beer, and similar items are often separately packaged and incorporated into common packaging and made available for selection and consumption by the customer. Beer, for example, is individually packaged in cans, the cans are assembled in six-packs as a retail package, and four retail six-packs are often assembled in a case. Other homogenous food stuffs are supplied to the retail trade packaged in individual packages for use by customers. For example, single use portions of ketchup in individual packages are sold in bulk to fast food restaurants to make ketchup available for customer use on hamburgers. Even fast food can be sold to the customer in individual packages. For example, U.S. Pat. No. 5,094,863 discloses packaging fast food in flexible packaging whose surface bears identifying symbolics and also images in the form of drawings and diagrams.

By way of further example, tobacco products are often wrapped in thin paper, and sold at retail in packages of 10 pieces or more. Those retail packages are shipped and sometimes sold in cartons. Some cigarettes are individually packaged in a hygienic protector which is removed before use. Cigars are packed for the retail trade in packs generally containing 3–5 pieces, and those retail packages are shipped and sometimes sold in cigar boxes.

By way of further example, condoms are typically placed in individual packages, and then placed in retail packages containing multiple, separately packaged condoms.

All of the above packaging traditionally functions to identify a manufacturer's products of a given kind and grade, and to allow the customer to identify the products and distinguish them from similar ones by competitors. However, despite all the effort by manufacturers to make their products interesting and informative to the customer, and to distinguish their product from the competitors, all packages of a manufacturer's product are essentially the same. Consumers are accustomed to seeing each package of the product with the same images, text, colors, instructions, and the like.

There is no method in the art for providing the consumer with varying images on the individual package, the consumer package, or the carton in such a manner that the consumer is likely to see a different image on each purchase or use of a product during a selected period of time. The principle of placing images which are not the identifying symbolics on a surface of various sorts of the products, or on their package, or on elements of the package, is known in the art. In particular, the images are placed on a surface of a toilet paper (see French patent application FR 2172929, IPC G 09 F 23/00, 1973), table napkins (see U.S. Pat. No. 5,573,830, IPC D 04 H 1/64, 1996), single cloths (see French utility certificate FR 2095115, IPC G 09 F 23/00, 1972), lottery tickets (see Russian patent RU 2093903, IPC G 09 F 23/14, 1997), post envelopes (see Russian patent 2099798, IPC G 09 F 23/10, 1997), cigarette packages (see European patent EP 0646531, IPC B 65 D 85/10, 1997), and other products. Most of the above patents relate to dissemination of advertising information. The advertising business is such that the efficiency of any advertising depends directly on its repetition of identical statements and/or images.

There two methods known in the art for providing the consumer with varying images on the individual package, however neither of these methods result in the consumer being likely to see a different image on each product purchased or used. The candy industry uses homogenous consumer packages containing shaped candy pieces, each bearing terse sayings, commonly sold under the trademark "Sweethearts." The sayings appear to be randomly distributed in the consumer package, and Applicant has no knowledge of any effort by the manufacturer to make it likely that the sayings in the consumer package do not repeat. The second method is used for individual servings of sugar and sweeteners. The servings are individually wrapped in packages that bear different images, often along a theme of flowers or places. Like the "Sweethearts," the distribution of the images appears to be random. Applicant has no knowledge of any effort by the manufacturers to make it likely that the images seen by the consumer do not repeat.

There is a need to present the customer with packages that readily identify the products contained therein while increasing customer demand and loyalty by making the contents attractive by placing varying pictures, images, symbols, text, and the like on the packages. To maintain customer interest, the additional images on the packages should not be identical, and should not repeat during a predetermined purchasing or use cycle by the consumer. Despite the tremendous amount of money and effort spent worldwide to attract and maintain customer interest in products, no system or method has been found in the prior art to accomplish this objective.

Therefore, it can be appreciated that there exists a need for a method to provide the customer with varied and non-repeating images on packages over a predetermined purchasing or use cycle. The object of the invention is to provide the above in a simple form that is easy to make and economical to manufacture.

SUMMARY

1. Objects of the Invention

The present invention is directed toward meeting the above needs. An object of the present invention is to provide a simple system to improve the attractiveness of products and increase customer loyalty, demand, and interest by creating a system for varying the images on the packages seen by the consumer over a selected purchasing or use cycle.

A second object of the present invention is to improve the attractiveness of products and increase consumer loyalty, demand, and interest by varying the appearance on at least a portion of the individual package of the product or the product itself such that it is likely each individual package selected or used by the customer during a predetermined period of time will a bear a different image.

Another objective of the present invention is to improve the attractiveness of products and increase consumer loyalty, demand, and interest by varying the appearance on at least a portion of the consumer package of the product such that it is likely each consumer package selected or used by the customer during a selected period of time will a bear a different image.

Yet another object of the present invention is to improve the attractiveness of products and increase consumer loyalty, demand, and interest by varying the appearance on at least a portion of the carton or bulk package of the product such that it is likely each carton or bulk package selected or used by the customer during a selected period of time will a bear a different image.

A further object of the present invention is to improve the attractiveness of products and increase consumer loyalty, demand, and interest by arranging the individual packages bearing the varying images within a consumer package so that the consumer sees either a randomly arranged pattern or an intentionally created pattern that varies over a predetermined purchasing or use cycle, such that it is likely that a different array of individual packages within each consumer package seen by the customer during a selected period of time will be different.

A further object of the present invention is to improve the attractiveness of products and increase consumer loyalty, demand, and interest by arranging the consumer packages bearing the varying images within a retail array so that the consumer sees either a randomly arranged pattern or an intentionally created pattern that varies over a predetermined purchasing or use cycle, such that it is likely each retail array seen by the customer during a selected period of time will be different.

2. Advantages of the Invention

The present invention provides a method to vary the images on a package or product that is seen by a consumer over a predetermined purchasing or use cycle, and thereby improve the attractiveness of products and increase customer loyalty, demand, and interest. The method having the features of the present invention involves the user selecting the number of packages, i.e., the group, that the consumer will see without the consumer seeing the same image repeated. The number of different images is a function of the number of packages in the group. The user selects suitable, different images equal to or greater than the number of images. The selected images are then placed on the package or product, one image per package or product. The packages or products are made available for viewing, selection, or use by the consumer in a manner selected by the user to maintain a desired level likelihood that a uniform distribution of the product or packages bearing the different images will occur.

For example, if a soft drink manufacturer wanted the consumer to see six containers without repeating an image, the manufacturer would select at least six different images for placement on the containers. The images are placed on the containers, one per container. Six containers bearing different images are then placed into one six-pack for purchase or use by a consumer. If the user desires a 100% likelihood that a six-pack contain six individual containers each bearing a different image, a method could be used that feeds one container with each image into the six-pack. If a lesser likelihood is acceptable to the user, the six containers could be selected for placement in the six-pack from a randomized mixture of the at least six images. The likelihood can be increased by increasing the number of different images used on the containers, the number being determined by using statistical and probability methods. The images in the group of images can be periodically changed to increase the likelihood that future purchases will bear different images.

The method contemplates that the product or package may also bear the manufacturer's customary symbolics identifying the name of the products, its quantity, some data on the enterprise, manufacturer, date of production, and similar readable information.

In an alternative embodiment, the user may select a period of time as a purchasing or use cycle for the user's target consumer. The user determines a typical number of packages purchased or used by the target consumer over the selected period of time, which becomes the group. The group can be determined by any technique, including but not limited to anecdotal, empirical, or sampling techniques, and the typical number can be a mean, a median, or some other measure acceptable to the user. The number of different images necessary is a function of the number of packages in the group. The user selects suitable, different images equal to or greater than the number of images necessary. The selected images are then placed on the package or product, one image per package or product. The packages or products are made available for viewing, selection, or use by the consumer in a manner selected by the user to maintain the desired likelihood that a uniform distribution of the product or packages bearing the different images has occurred. The images in the group of images can be periodically changed to increase the likelihood that future purchases will bear different images.

For example, if a soft drink manufacturer wanted the average user not to see a repeat of an image for a month, then the manufacturer could conduct a survey to determine the average number of six-packs purchased or used by an average consumer in a month. Under this alternative embodiment, statistical and probability methods may be used to determine the number of different images necessary to attain an acceptable probability that the average consumer will not see an image more than once during the month. For the purpose of this example, it is assumed the study shows the average consumer purchases or consumes five six-packs each month. At least five images are required to be put on the six-packs for the consumer to be able to purchase without duplication of images during in the month.

If the user of the invention desires that the consumer see different images on the individual containers in each six pack purchased or consumed during the month, statistical methods can be used to determine the number of different images required to attain the degree of likelihood acceptable to the user that the images on will be different. For the purpose of this example, it is assumed the study shows the average consumer purchases or consumes thirty containers per month, and that those containers are acquired in five, separate purchases of one six-pack each. Using 96 different images, 16 six-packs could be packaged with no duplication of images on the containers. However, because the customer makes five separate purchases, the customer would have approximately a $4/16$, or 25% chance of purchasing a six-pack with a duplicate image during a month. The number of images and packaging methods can be adjusted using statistical and probability tools to determine the distribution of containers with different images among the six-packs and containers of four six-packs to achieve the likelihood desired by the user.

The images are selected to give the packages or products greater attractiveness to the consumer, to entertain, stimulate, attract, educate, instruct, train, or provide other positive effect on the consumer, and to provide a distinction between otherwise homogeneous products or packages.

The images may include riddles, proverbs, sayings, aphorisms, signs, wishes, parting words, puzzles, rebuses, chess tasks and etudes, and conundrums, and they may be logically interconnected.

The invention also includes products packaged according to the method of the invention.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of claims.

Thus, an advantage of the present invention is that it provides a method for giving a greater product identity, and greater consumer usefulness, attractiveness and interest in generally homogenous products by varying the appearance on at least a portion of the packaging such that it is likely each package selected or used by the customer during a selected period of time or over a selected number of packages will a bear a different image.

An additional advantage of the invention is that it is infinitely scalable. As few as one group of the products can be packaged according the method of the invention. Several groups or sets of groups can be packaged by scaling the invention upward.

In this respect, before explaining at least one embodiment of the invention in detail, it is to be understood that the invention is not limited in its application to the details of construction, to the arrangements of the components, or to the methodology set forth in the following description or illustrated in the drawings, and the specifications. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

These and other features, aspects, and advantages of the present invention will become better understood with regard to the following description, appended claims, and accompanying drawings where:

DESCRIPTION OF PREFERRED EMBODIMENT

Figure 1:
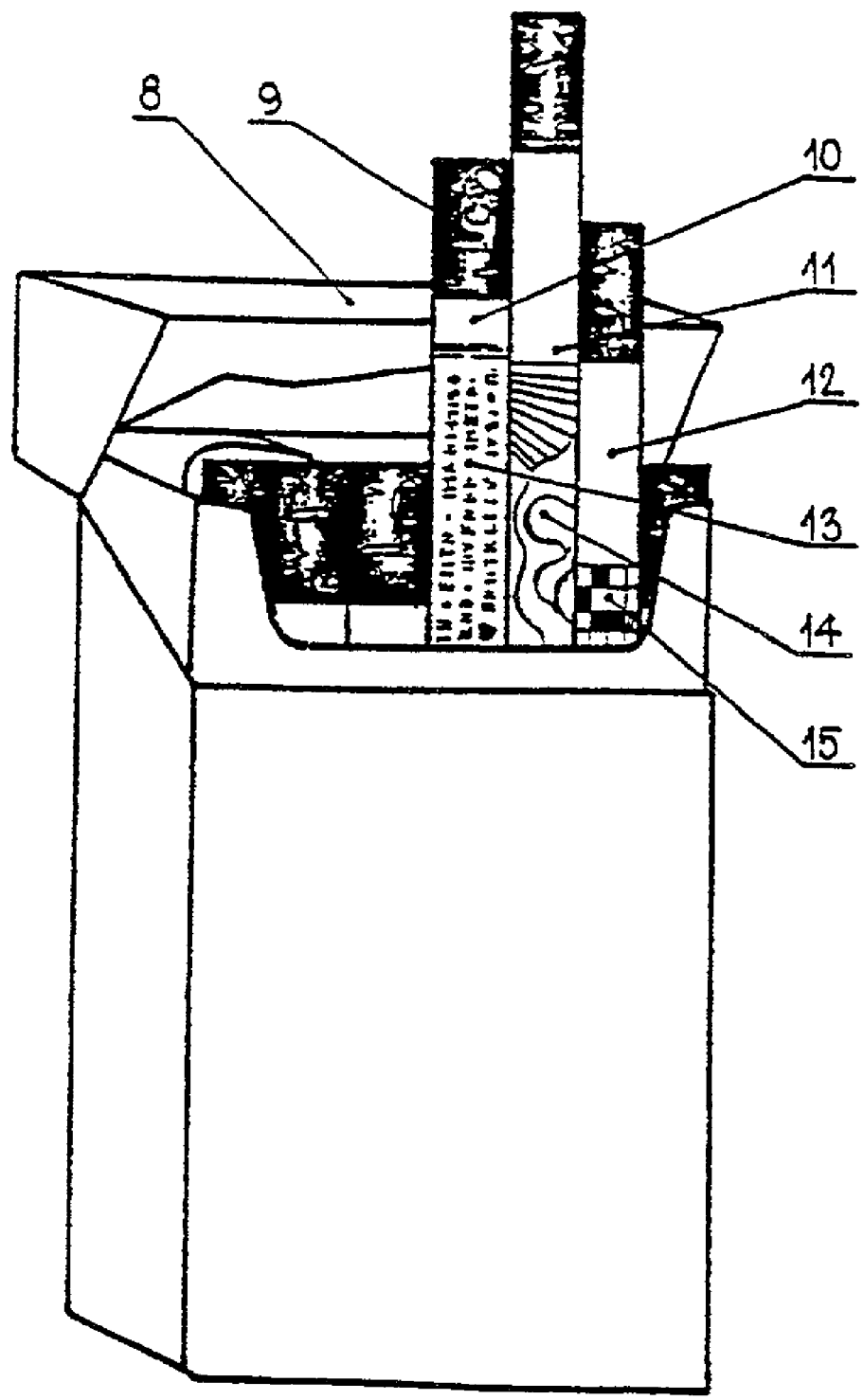
FIG. 1 illustrates a version of the invention used with the individual packaging of cigarettes.

1. Definitions.

References to image or images include but are not limited pictures and text, and may be both. Text may be textual fragments such as vignettes, riddles, proverbs, sayings, aphorisms, parting words, wishes, popular expressions, or the like. A picture may be a graphic, pattern, ornament, abstract figure, image, rebuse, puzzle, mysterious picture, or caricature. The image may be instructional, educational, entertaining, or other matter attractive to the consumer. The image may be concerned directly with the contents of a package. The images may be logically interconnected. The answer to riddles can be placed on an opposite side of the container.

References to an individual package include, but are not limited to, the wrapping or containment of one unit of the product or sufficient quantity of the product for a single use. Typically, only one item of the product is included in the individual package, however the individual package can include more than one unit of the product.

References to consumer package include but are not limited to the package generally viewed by the consumer in selecting a product for purchase or use. A consumer package contains one or more individual units of a product.

References to carton include but are not limited to a package generally used to ship and/or to display one or more consumer packages at retail. A carton contains one or more individual consumer packages.

References to consumer include but are not limited to the person who selects the packaged product for purchase, or the person who expends or uses the products in any manner.

References to placing an image on an individual package or a consumer package according to the method of the invention also include placing an image on the product itself.

2. Overview.

The present invention provides a method to vary the images on a package or product that is seen by a consumer over a predetermined purchasing or use cycle, and thereby improve the attractiveness of products and increase customer loyalty, demand, and interest. The method is scalable, and can be used to produce both small and large volumes of packages bearing different images. The method can be used on both on the packages containing the products as well as on the products themselves. For the purpose of clarity, all references in this Application to placing the images on a package shall also include placement of the image on the products.

The method contemplates that the product or package may also bear the manufacturer's customary symbolics, trademarks, and service marks.

The method having the features of the present invention involves the user defining several parameters. The user selects or determines the number of packages, i.e., the group, that the consumer will see without the consumer being likely to see the same image repeated. The number of different images necessary is a function the number of packages in the group. The user selects suitable, different images equal to or greater than the number of different images necessary. The selected images are then placed on the package or product, one image per package or product. The packages or products are made available for viewing, selection, or use by the consumer in a manner selected by the user to maintain a desired likelihood that a uniform distribution of the product or packages bearing the different images has occurred.

If the method is employed to simply vary the images on the individual packages in a group consisting of one consumer container with a 100% likelihood, the user selects a group of images at least equal in number to the individual packages in the consumer container, and configures production so that four individually package rolls with different images are placed in the consumer package. For example, toilet paper is often packaged with four individually wrapped rolls in one consumer package. Individual rolls of toilet paper would be packaged using at least four different images, and one of each placed in the consumer package. The same group of different images can be used for all the individual containers placed in all the consumer packages manufactured during one period of time, and then a new group of images can be used for a next period of time.

If the group of consumer packages is increased to ten, the user has a choice. The user can continue using only four different images on the individual packages, and make the image content in each consumer package the same. In the alternative, the user can simply scale the method up by using a group of forty images so that each consumer container has four differently packaged individual rolls, and none of the ten consumer packages has image content that is a duplicate of another consumer roll.

By way of further variation in the method, the user can decide to use number more than four different images, and randomly distribute the individually packaged rolls to the ten consumer packages. The likelihood that a consumer will see a repeated imaged in this variation can be statistically determined by the user. The size of the group of images is determined by the user, based upon the user's selected level of the likelihood of non-repetition.

In an alternative embodiment, the user may select a period of time as a purchasing or use cycle for the user's target consumer. The user determines a typical number of packages purchased or used by the target consumer over the selected period of time, which becomes the group. The group can be determined by any technique, including but not limited to anecdotal, empirical, or sampling techniques, and the typical number can be a mean, a median, or some other measure acceptable to the user. The number of different images necessary is a function of the number of packages in the group. The user selects suitable, different images equal to or greater than the number of images necessary. The selected images are then placed on the package or product, one image per package or product. The packages or products are made available for viewing, selection, or use by the consumer in a manner selected by the user to maintain the desired likelihood that a uniform distribution of the product or packages bearing the different images has occurred.

For example, if a soft drink manufacturer wanted the average consumer to be able to purchase a consumer package without repeating an image for a month, the manufacturer could conduct a survey to determine the average number of six-packs purchased or used by an average consumer in a month. Under this alternative embodiment, statistical and probability methods may be used to determine the number of different images necessary to attain an acceptable likilihood that the average consumer will be able to purchase a consumer package without repeating an image more than once during the month. For the purpose of this example, it is assumed the study shows the average consumer purchases or consumes five six-packs each month. At least five images are required to be put on six-packs for the consumer to be able to purchase without duplication of images during in the month.

If the user of the invention desires that the consumer see different images on the individual packages in each six pack purchased or consumed during the month, statistical methods can be used to determine the number of different images required to attain the degree of likelihood acceptable to the user that the images on will be different. For the purpose of this example, it is assumed the study shows the average consumer purchases or consumes thirty packages per month, and that those packages are acquired in five, separate purchases of one six-pack each. Using 96 different images, 16 six-packs could be packaged with no duplication of images on the packages. However, because the customer makes five separate purchases, the customer would have approximately a $4/16$, or 25% chance of purchasing a six-pack with a duplicate image in a month. The number of images and packaging methods can be adjusted using statistical and probability tools to determine the distribution of packages with different images among the six-packs and packages of four six-packs to achieve the likelihood desired by the user.

3. Examples.

FIG. 1 shows a consumer package 8 with filtered cigarettes 9 placed in individual packages 10–12 made up of paper more dense than the cigarette paper and slightly longer than the cigarettes. The individual packages 10–12 bear different images 13–15, respectively. The method of the invention is used to apply different images to the cigarettes to make the cigarettes interesting from the point of view of the consumer. The individual packages protects the cigarette from the environment, helps preserve freshness, and creates a surface for placement of images according to the method of the invention. The method of the invention can be used to package other tobacco products like cigars.

The method of the invention has been practiced on paper based, hygienic products. For example, a group of twenty different images was printed on the surface of paper cloth meeting the table napkin quality requirements. The layout of images on the surface was such that the paper cloth was then cut into twenty parts to form twenty paper napkins, each bearing a different image. In the process of manufacture, the group of twenty different images was replaced four time by other groups of twenty different images. As a result, 100 napkins were manufactured to be placed in a consumer package, each with non-repeating images. The images used for various manufacturing runs included a series of ornamental designs, riddles, text fragments, proverbs about winter, and matters related to a New Year's party at a restaurant. For the restaurant, a series of three different images was printed, and the series was then continuously repeated. The average customer sees 3–4 napkins per visit, so the cycle of three created a sufficient likelihood that the customer would not see the same image repeated. Another example is printing consecutive frames of a Disney™ cartoon on a continuous tape of paper to manufacturer toilet paper. The tape of paper is cut into appropriate lengths for a roll of toilet paper, each sheet containing one frame. The natural inquisitiveness of children is expected to induce them to use more of the hygienic products, thus enhancing their hygienic skills.

The method of invention has been practiced on piece confectionary products. It is assumed that the average consumer normally purchases about 15–30 individual candies or sweets, or 1–2 chocolate bars, at a time. As a result, the number of images used on piece confectionary products is greater than on chocolate bars. The chocolate candy was individually packaged in a paper envelope bearing images of texts, national symbols, and the like. In a group of 100 candies, each of 50 images was repeated two times. The manufacturer believed the configuration of the groups provided an acceptable degree of likelihood that the images seen by a customer would be different. In another example, chocolate bars were individually packaged with images containing poems or fragments of poems about a city and pictures of the city's architectural monuments. In a group of 20 bars, five images were repeated four times. The manufacturer believed the configuration of this group made it reasonably likely that each package purchased by a consumer would bear different images. Another example is packaging chewing gum. In a group of 100 sticks, 25 different images were repeated four times, with the same insignificant probability of repeated purchase by one consumer of a sticks with identical images.

The method of the invention has also been practiced with diapers and sanitary linings. In a group of 30 individually packaged sanitary linings, a group of 30 different images were used, one on each individual package. The images including texts of hygienic advice and appropriate illustrations. Thirty individually packaged linings were packaged into one consumer package. In a group of 30 children's diaper, the same method was used. A group of thirty different images was used once for each diaper. The thirty diapers were packaged into one consumer package. The group of images for both the diapers and the linings was periodically changed to minimize the probability of repeated purchase of the same images by one consumer.

The method of the invention has also been practiced for individually packaging used of products supplied to the retail trade. Perfume and cologne are individually packaged in small boxes. A group of five different images was selected, including colorful pictures of garden and country flowers, poetic stanzas related to flowers, and kind wishes. A roll of packaging material was prepared for 100 consumer packages, and each image from the group was repeated 20 times. Each individual package was packaged in a consumer package with one of the images. Because of the low periodicity of repeated perfume and cologne purchase, it was statistically likely that a repeat consumer would purchase a package with a different image. Sweets are often sold by weight. A group of 20 different images was selected, including ornaments, color figures of fantastic characters, and aphorisms associated with the figures. Each portion of sweets was individually packaged, and there was an insignificant probability of repeated purchase by one consumer of sweets with identical images.

The method of the invention has also been practiced for packaging condoms. Individual condoms were hermetically sealed in packages of a polymeric material. Five individually packaged condoms were packaged in a rigid envelope as a consumer package. The manufacturer's symbolics and bright colors were placed on the surface of the consumer package. A group of four different images was selected for placement on the inside surface of the consumer package. The images were erotic photos of various content. A group of one hundred consumer packages was prepared with an image on the inside, with each image repeated 25 times. In a market with lower turnover, a group of ten different images was selected along the same theme. A group of one hundred consumer packages was prepared with an image on the inside, with each image being repeated ten times. In both markets, the images were changed with each shipment of a group of one hundred packages.

The method of the invention has also been practiced for packaging homogenous products supplied to the retail trade. Individual portions of crushed tea were individually packaged in paper packs. A group of 300 riddles and answers was selected for placement on the individual packages, the riddles for one side of the packs and the answers for the other. A group of 300 individual packages was prepared with a different riddle on each individual package. Ten consumer packages were prepared, each containing 30 individual packages.

The method of the invention has also been practiced for packaging homogenous household products and products used daily. A group of ten different images, comprising short poems from a school program, were used for placement on 100 bottles of milk. The method was used for wine bottles. Images comprising entertaining histories and playful pictures were used in sufficient number that only 30 labels on 100 bottles contained the same images.

In all of the examples, it was statistically likely to a degree acceptable to the user that the images appearing on each individual package contained within a consumer package were different from the images appearing on any individual package contained in any other consumer package in the group of consumer packages.

Numerous other forms of the invention, fully within the spirit and intent of the present invention, could be devised. These, and other modifications to the preferred embodiment would be obvious to one of ordinary skill. Therefore, it is intended that the foregoing detailed description be regarded as illustrative, rather than limiting, and that it be understood that it is the following claims, including all equivalents, which are intended to define the protected scope of this invention.

I claim:

1. A method for preparing customized product packaging by varying images appearing on packages of products, said method comprising:
   a. selecting a period of time over which the average consumer will have a selected probability of not seeing an image repeated,
   b. determining the average number of packages purchased or used by the average consumer over said selected period of time,
   c. determining by statistical or probability methods a size of a group of different images to be placed on the group of packages that is necessary to attain the selected probability that the average consumer will not see an image repeated over said selected period of time, the size of said group of different images being a function of the average number of packages determined in step (b),
   d. selecting different images equal in number to size of the group of different images determined in step (c); and
   e. preparing the group of packages by placing one image randomly selected from the group of different images on one package, and continuing by placing another image randomly selected from the group of different images on another package, and further continuing likewise until the size of package determined in step (c) is complete.

2. The method of claim 1, wherein the method additionally comprises preparing more than one group of said packages at a time.

3. The method of claim 1, wherein the images in the group of different images are changed after a selected time period.

4. The method of claim 1, wherein the method additionally comprises:
   a. producing a group of individual packages; and
   b. assembling a consumer package by placing at least two packages from the group of individual packages into said consumer package, whereby, each individual package in the consumer package will appear to the consumer to bear different images.

5. The method of claim 4, wherein the method additionally comprises placing at least three individual packages into said consumer package in a random visual order, whereby, such individual packages in the consumer package will appear to the consumer to bear a different image at each consumer's purchase.

6. The method of claim 1, wherein the method additionally comprises:
   a. producing a group of consumer packages; and
   b. assembling a carton by placing at least two packages from the group of consumer packages into said carton, whereby, each consumer package in the carton will appear to the consumer to bear different images at each consumer's purchase.

7. The method of claim 6, wherein the method additionally comprises placing at least three consumer packages into said carton in a random visual order, whereby, the individual consumer packages in the carton will appear to the consumer to bear a different image at each consumer's purchase.

8. The method of claim 1, wherein the method additionally comprises assembling a carton by placing at least two packages randomly selected from the group of consumer packages into said carton, whereby, each consumer package in the carton will appear to the consumer to bear a different image at each consumer's purchase.

9. The method of claim 8, wherein the method additionally comprises placing at least three consumer packages into said carton in a random visual order, whereby the individual consumer packages in the carton will appear to the consumer to bear a different image at each consumer's purchase.

10. The method of claim 1, wherein the period of time repeated is a purchasing or use cycle.

* * * * *